Patented Aug. 6, 1946

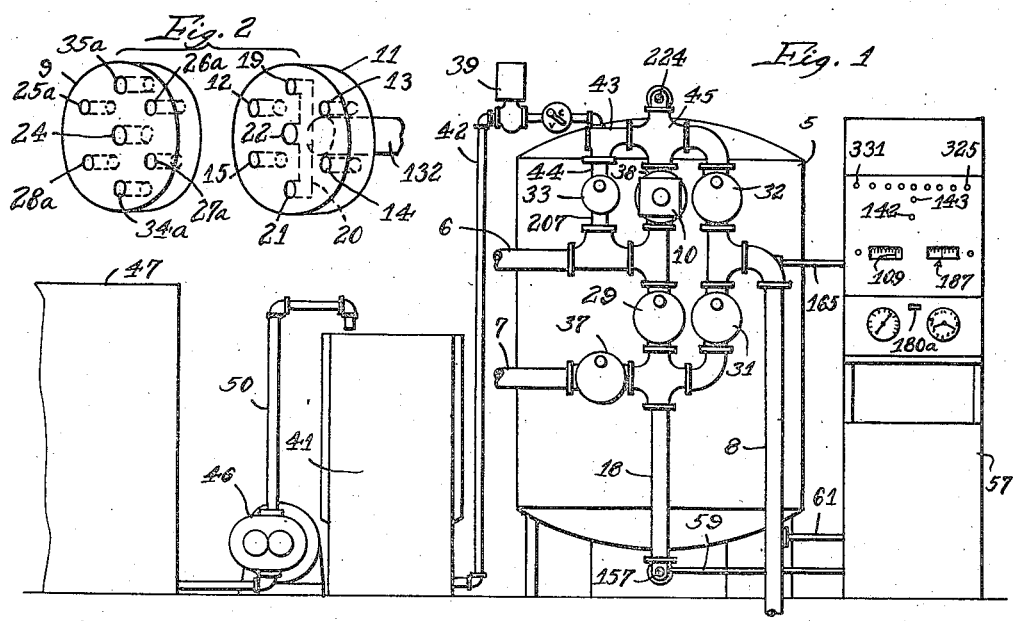

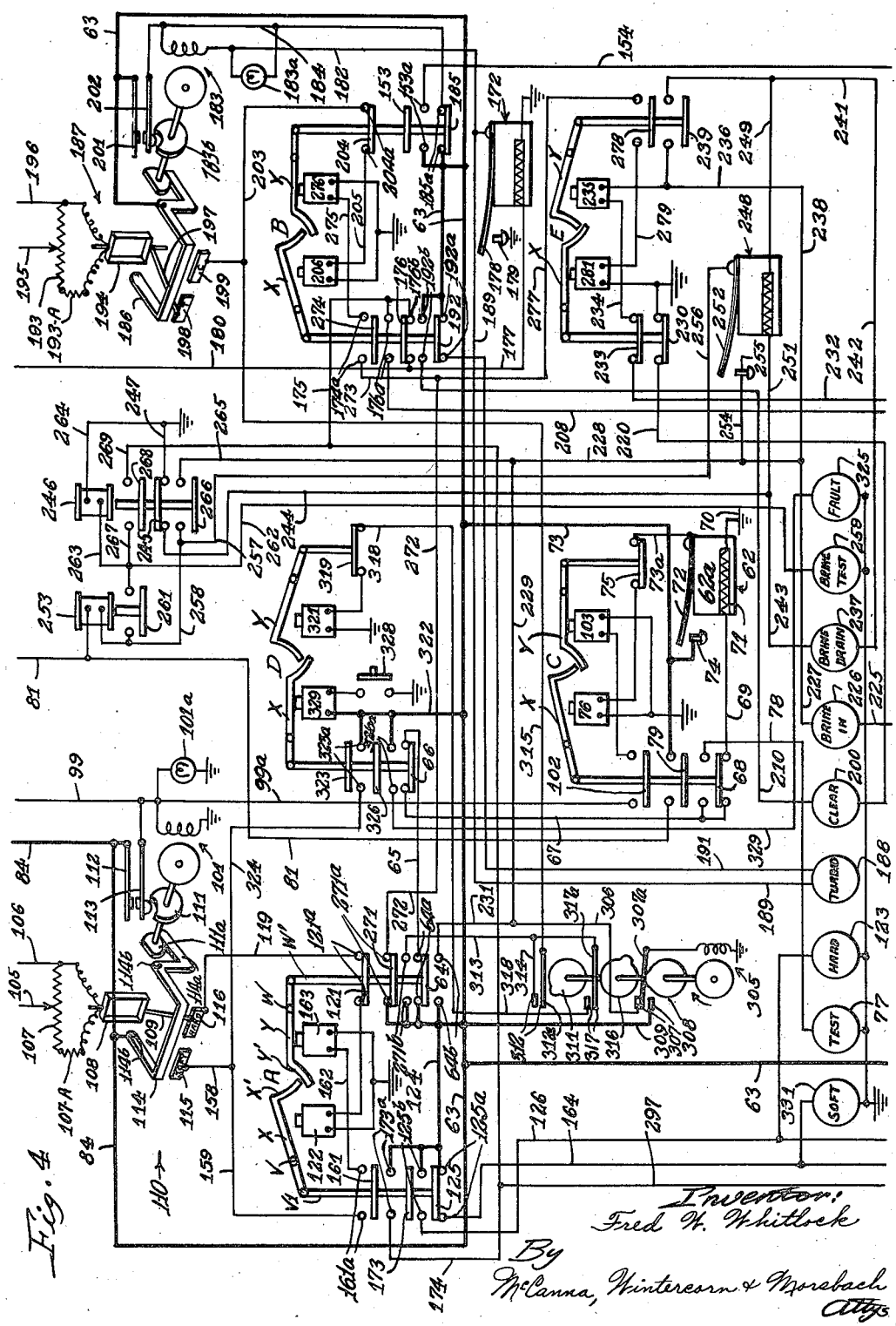

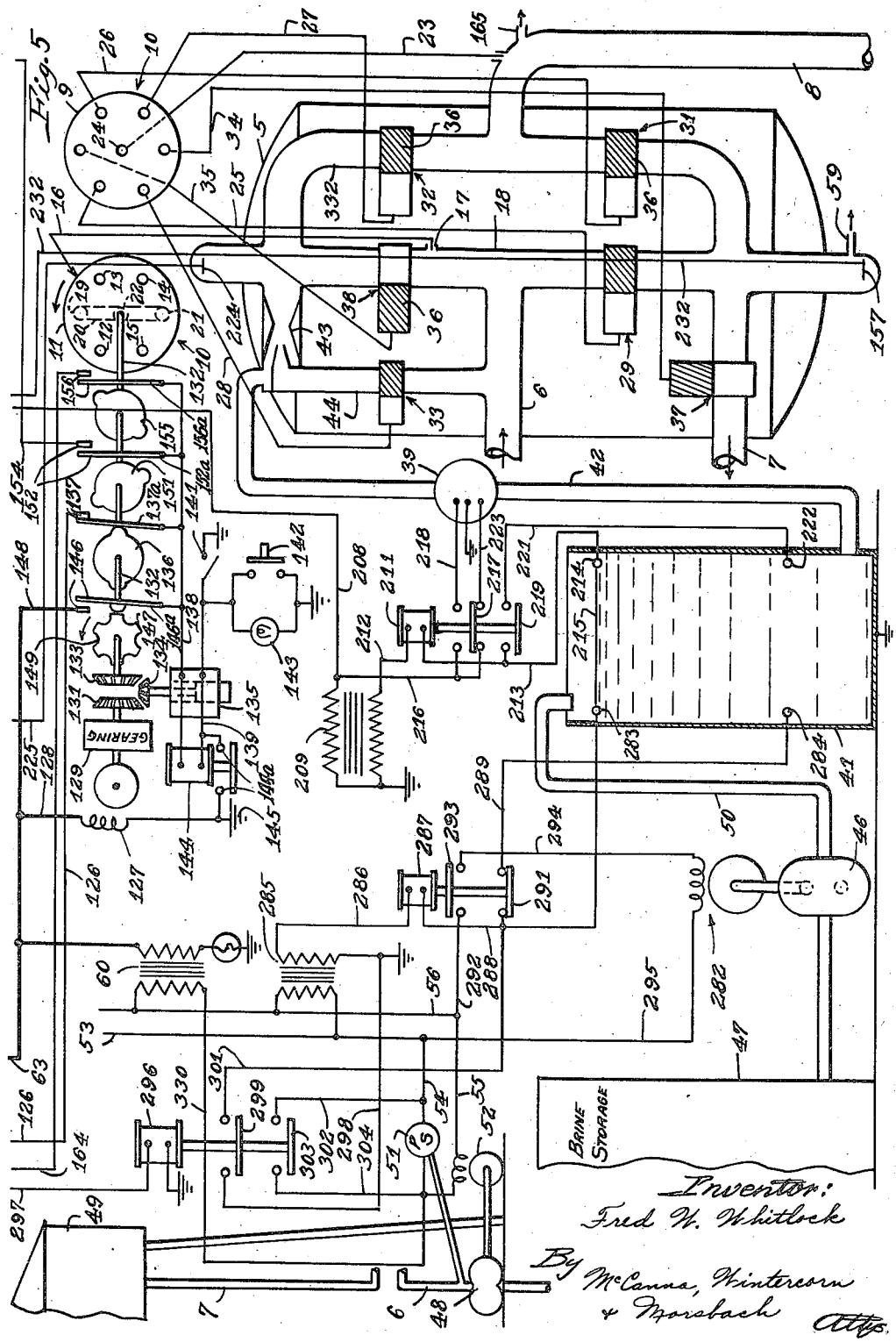

2,405,479

UNITED STATES PATENT OFFICE 2,405,479

WATER TREATMENT DEVICE

Fred W. Whitlock, Rockford, Ill., assignor to Automatic Pump & Softener Corporation, Rockford, Ill., a corporation of Illinois Application May 31, 1941, Serial No. 396,055

31 Claims. (Cl. 210—24)

My invention relates to improvements in water treatment devices and control means therefor.

One of the objects of my invention is to provide a water treatment device in which all phases of regeneration such as service, backwash, introduction of regenerating fluid and rinse are automatically controlled in response to tests made upon the effluent of the softener, in particular, such tests are made to indicate hardness to determine when regeneration should be initiated, for turbidity during the backwash phase to determine when washing should be terminated and for regenerating fluid in the rinse to determine when the device should be returned to service.

An object of my invention is the provision of a device connected with a liquid treatment apparatus that will measure the turbidity of the liquid during some phase in its treatment and will signal an operator or terminate the operation of this treatment phase upon the liquid reaching a predetermined degree of clearness.

Another object of my invention is to provide a water softening device having a system of hydraulic valves immediately controlled by a pilot and having an electrically controlled staging device for accurately indexing the pilot in response to tests being made upon the effluent of the softener.

It is also an object of my invention to provide a novel control system for the steps in a liquid processing device, one transformation of this general object being a novel valve operating and control means through which a plurality of valves may be actuated to each one of a sequence of positions in response to tests being performed upon the said liquid.

A further object of my invention is to provide an automatically controlled water treatment device requiring a periodic regeneration in which an electrical clean-up device acts as a secondary automatic control to take over operation of the device during the regeneration cycle whereby it is returned to service, in the event of fault occurring in a primary control system which includes automatic testing means for controlling the steps of regeneration.

Other objects of my invention will appear from the following disclosure, wherein—

Figure 1 is a side elevation of tanks, valves, conduits and instrument board of the softener;

Fig. 2 is a view of two elements of the pilot controlling the hydraulic valves; and Figs. 3, 4 and 5 taken together constitute a wiring diagram of the softener, Fig. 3 being a vertical extension of Fig. 4, and Fig. 4 being a vertical extension of Fig. 5, the views also showing in diagrammatic form other structural features of the device.

Specifically my invention is shown as applied to and part of a water treatment apparatus having a regenerating solution such as brine, and a regenerable material such as zeolite within a softening tank. It will be apparent from the disclosure of this invention that it has numerous other applications such as to water treatment devices of various kinds and devices controlling the flow of liquid through valve operation wherein electrical control means and other mechanisms may be utilized to achieve automatic and improved operation. The softener disclosed herein is adapted for fully automatic or semi-automatic operation. In the semi-automatic setting, the softener is caused to pass from one of its regeneration steps to another by manually closing a switch at the termination of each step.

As is clear from Figure 1, the embodiment of my invention herein shown has a softening tank having conduits connected therewith for the introduction of hard water, carrying away of treated water to a service line, and draining of water utilized in backwash, brine and rinse steps during the regeneration cycle. The valves controlling the flow through this system, with the exception of certain motor valves, are hydraulically operated and are built substantially according to the teachings of U. S. Letters Patent issued to Griswold, No. 2,193,720. The valve positions are immediately controlled by a staging device having a pilot from which tubes are connected to the valves. Water is used as the valve control fluid, a valve diaphragm being moved from its open position by hydraulic force in the tube from the pilot and being returned to its open position by release of this pressure and in response to pressure in the pipe in which the valve is disposed. The staging device includes a continuously running motor, and an electrically controlled selectively engageable means through which the motor is engaged to drive the pilot through sequence of pilot positions.

A hardness testing device is located in the instrument panel to test periodically for a predetermined amount of hardness in the effluent of the softener. A line supplying fluid for test samples to the hardness tester is tapped into the softener conduits at a point ahead of the service and drain outlets.

When the water going to the service line reaches a predetermined degree of hardness, circuits and relays are actuated to indicate this condition to the operator and, if the device is set for automatic operation, to initiate the regenerating cycle and discontinue service. This is accomplished by causing the pilot to index 60° to the first stage. At this time, circuits to the hardness tester are broken to retire it temporarily from operation. Here, the first step in the regenerating cycle is the backwash phase which is well known to those skilled in the water treatment art. The duration of this step is controlled by a turbidity testing device comprising, among other elements, an observation cell placed between a source of light and a light sensitive cell. Backwash fluid from the drain is passed continuously through this observation cell during this phase. When the turbidity of the fluid is reduced to a predetermined degree, the selectively engageable means on the stager is actuated to index the pilot through a further 60°, whereupon the backwash stage is terminated and the brine stage is initiated. Brine is carried into the tank by an injector and its flow is terminated by operation of a motor valve upon the introduction of a predetermined quantity thereof. The softener then proceeds, without further valve movement, to the rinse step which continues until spent and excess brine are washed clear of the tank. This point is determined by the hardness tester which, in the meantime, has returned to operation. At the conclusion of the rinse step, the pilot has been indexed to complete 180°, thereby causing the valves to return to the service position and complete a cycle of regeneration.

A clean-up device is provided to take over in the event of control or operational failure during the regeneration period. While the softener is set for fully automatic operation, it will, if in the backwash stage, be carried from the backwash stage to the next of the succeeding stages if fault develops to delay the normal termination of the backwash step and initiation of the brine step in response to the turbidity testing device. If the fault is such that the softener is not automatically returned to service after the expiration of a predetermined time, during which the softener would normally have completed regeneration, the clean-up device will return the softener to service, signal the operator of this condition, and lock out further automatic controls.

Tanks, valves and conduits

A softening tank 5 is of a conventional sort, being fully closed and containing a mineral such as zeolite, which requires periodic regeneration. 6 is the inlet line to the tank 5, 7 is the service line and 8 is the drain line. The flow through the tank is controlled by a system of individual hydraulic valves all of which are controlled by a pilot, generally designated by the numeral 10. The pilot 10, which is a modification of the pilot mechanism described in U. S. Patent 2,193,720, issued to Griswold, includes a stationary plate 9 and a movable plate 11.

The pilot 10 is adapted to control six valves in a manner so that at any one time four of them will be closed and the other two open. The inner faces of the stationary plate 9 and the movable plate 11 each has six openings spaced about the periphery at 60° intervals and at equal radial distances from the center so that upon a 60° rotation of the movable plate 11, a different series of openings in the plates 9 and 11 will be in registration with one another.

Figs. 2 and 5 show two members of the pilot 10, the stationary plate 9 and the movable plate 11 that is indexed through a cycle of rotation. The plates 9 and 11 are enclosed by a casing which acts as a support therefor, in accordance with the teachings of said patent to Griswold. This casing has a rear chamber through which hydraulic pressure is transmitted to openings 12, 13, 14 and 15 in plate 11 and thence to the openings in stationary plate 9 in registration therewith, the source fluid of hydraulic force in the rear chamber being a tube 16, having one end connected therewith, the other being connected with the inlet water at a point 17 in a vertical pipe 18 connected to the top and bottom of the tank 5. Openings 19 and 21 and center opening 22 in the movable plate are interconnected by a passageway 20 in order that the two peripheral openings in the stationary plate 9 that are in registration therewith may be bled off through a drain tube 23 that connects at one end with the drain 8 and at the other with a center opening 24 of the stationary plate 9. In an operative position then, as, for example, that shown in Fig. 5, fluid pressure will be applied to the openings in stationary plate 9 which are in registration with openings 12, 13, 14 and 15 of movable plate 11, thereby carrying hydraulic pressure through tubes 25, 26, 27 and 28, respectively, that connect with openings 25a, 26a, 27a and 28a, respectively, in stationary plate 9. Pressure in these particular tubes causes the closing of valves 29, 31, 32 and 33, the diaphragms of which are indicated by cross-hatching in Fig. 5 and are shown in the service position supplying water to the service line 7 while openings 19 and 21, being connected with tubes 34 and 35 at 34a and 35a, will release the pressure in these tubes and permit diaphragms, generally designated as numeral 36, in valves 37 and 38 to move to the open service position in response to pressure of the liquid within the pipes in which they are located as taught in said patent to Griswold. The valves 29 and 38 are located in the pipe 18, the valve 29 near the bottom thereof, and the valve 38 near the top. The valves 31 and 32 are located on opposite sides of the drain pipe 8 in a vertical pipe 332 connected to the pipe 18 above the valve 38 and below the valve 29. The valve 37 is located in the service pipe 7 and the valve 33 is located in a branch pipe 44 from the hard water pipe 6 leading through an injector 43 and into the pipe 18 between the top of the tank 5 and the valve 38. These valves occupy the position shown in Fig. 5 during service operation of the softener. During backwash operation of the softener the valve 37 is closed, the valve 29 is open to direct water from the pipe 6 into the bottom of the softener, the valve 32 is open to permit water to flow from the top of the softener through the pipe 332 to drain pipe 8, and the valves 31, 38 and 33 are closed. During the brining step or the step in which brine is being taken into the softener and during the rinse step, the valves 33 and 31 are open and the valves 29, 32, 37 and 38 are closed. The bleeding off of tubes 34 and 35 is permitted through the center opening 24 that connects with the passageway 20 and with the drain tube 23. As movable plate 11 is caused to index through its angular stages, in this case being equivalent to a rotation of 60°, the four valves having tubes connected with openings 12, 13, 14 and 15 are closed at each stage through pressure applied therein as described in said Griswold patent, whereas the two valves having tubes connected with openings 19 and 21 will be permitted to open in response to line pressure within the pipes in which they are located. The operation of the hydraulic valves controlled by pilot 10 is so correlated with a motor valve 39 controlling the introduction of regenerating solution such as brine that the well known regenerating steps of backwash, brine, rinse, and return to service are effected by three 60° movements of the movable plate 11. Therefore, after each 180° movement of the movable plate 11, a regeneration cycle is completed.

Brine is carried from a brine tank 41 through a pipe 42 on which is located the valve 39 to an injector 43 that is positioned in a pipe disposed between the pipe 44 and a four-way pipe fitting 45 in the vertical pipe 18. When hydraulic valve 33 and motor valve 39 are open, water from inlet 6 flows through pipe 44 through the injector 43, thence through vertical pipe 18 to the top of the tank 5, causing brine to be sucked from the brine tank 41 and merged with the water at the injector to pass to the top of the softener tank 5 in a combined flow. This solution is carried down through the zeolite bed to regenerate the same, then out to drain. The brine level is properly maintained in the brine tank 41 by an automatic control on a pump 46 connected with a brine storage tank 47 through which the brine tank 41 is refilled after the softener is returned to service. Pipe line 50 connects the storage tank 47 to the brine tank 41.

As shown by Fig. 5, this water treatment device is adapted for use with a well storage system. By this arrangement, all water entering the inlet line 6 is pumped through the electrically operated pump 48. All the treated water is then carried to the storage tank 49 through the service line 7. When the water level in the tank 49 falls to a predetermined level, a pressure switch 51 will complete a circuit to the pump motor 52 to refill the tank 49 with softened water. This circuit is through the line 53, lead 54, switch 51, motor 52, lead 55 and line 56.

*The hardness tester*

The hardness tester which performs the testing operation is constructed substantially in accordance with the principles shown in U. S. Letters Patent 2,254,782, issued September 2, 1941, to A. L. Riche, and is located in the instrument panel 57. As shown by Figs. 1 and 3, water is supplied to an observation cell 58 through a pipe 59 that is tapped into the bottom portion of the vertical pipe 18 of the softener. In this instance the tester includes a glass test cell 118 having a photo-electric cell 104 disposed on one side of the test cell and a lamp 98 disposed on the opposite side to project light through the test cell onto the photo-electric cell 104. Disposed within the test cell is a wiper 117 having blades 117a bearing against the inner surface of the test cell in order to remove sediment, the wiper being driven from a shaft 82a of a motor 82 as described in said Riche patent, the wiper being disposed in such relation to the remainder of the device that it is out of the path of light between the lamp and the photo-electric cell when the lamp is energized for a test. When the hardness test is initiated, a sample of water will flow from the vertical pipe 18 through the pipe 59 to the observation cell 58, the displaced water flowing out to the drain line 8 through a pipe 61 this flow of water being controlled by means presently to be described.

The periodic testing cycles of the hardness tester, in this instance at ten minute intervals, are initiated by the closing of a circuit through the operation of a thermal timer 62. The thermal timer 62 as well as the other thermal timers presently to be described may be of any well known type commonly obtainable on the market. These timers are obtainable to operate in different time ranges, the time interval being determined by the adjustment of the contacts, by the nature of the bimetal employed, the size and nature of the block, and the heating rate of the coil. While the structure of the timer forms no part of the present invention, in this instance it comprises a block of metal 62a carrying an electrical heating coil 71 for heating the block and a bimetallic blade 72 secured to the block and movable in response to change in temperature of the block to close or open a contact. Referring to Figs. 4 and 5, the circuit to the timer 62 is from transformer 60, power lead 63, contact 64 of relay A, lead 65, contact 66 of relay D, lead 67, contact 68 of relay C, lead 69, heater 71, to ground. Relay A, as are relays B, C, D and E, is commonly known as the latch-in type, such as shown in U. S. Letters Patent 2,114,862 to Karl H. Sommermeyer, a suitable form being sold by G. M. Laboratories, of Chicago, Illinois, under the name "Type L Twin Latch Relay." The relays each have arms X and Y which shift from one position to another in response to energization of one of the electromagnets, the arms having interlocking ends X, and Y, which interlock to hold the arms in any one position, though both electromagnets are deenergized, until the other electromagnet is momentarily energized. Thus the relay arms may occupy either the position shown by relay E of Fig. 4 with the end $Y_1$ above the end $X_1$ or the position of relay A of Fig. 4 with the end $X_1$ above the end $Y_1$. The positions of the relays shown in Fig. 4 corresponding to the positions occupied thereby while the service water is running soft I have called the normal positions of the relays. The arms X and Y are pivoted at V and W and pivotally support depending stems $V_1$ and $W_1$ upon which bridging contacts are carried in the usual manner. Thus, if at any time the power circuit is interrupted, the setting of the controls in this water treatment device will not be interfered with; consequently, it will resume at the point left off when the power is restored. The circuit completed by heating of blade 72 of the thermal timer 62 is through power lead 73, contact point 74, blade 72, line 73a, contact 75, to electromagnet 76, to ground, thereby energizing electromagnet 76 of relay C to cause this relay to shift to the abnormal position with the end of arm X below that of arm Y. The movement of the arm Y opens contact 75 to again deenergize the electromagnet 76 leaving the relay in the abnormal position as explained above. This shift breaks the circuit to the thermal timer 62 at contact 68, completes a circuit to "test" lamp 77 through lead 67, contact 68 and lead 78. Contact 79 of relay C completes a circuit from power lead 73 to lead 81 and lead 86 which goes to the hardness tester motor 82 and to ground, thereby actuating the motor. The contact 102 of relay C is closed to precondition a circuit to the electromagnet 103 to return the relay C to its normal position upon closing of switch 96 by way of circuit including switch 96, lead 99, contacts 102 and magnet 103 to ground. A cam shaft 82a carrying cams 83, 87 and 95 is driven by the motor 82 as described in said Riche patent. As motor 82 begins to rotate, cam 83 provides a means for sustaining the motor circuit during its one revolution movement, the lobe thereof permitting lever 85a, which is spring pressed toward the cam, to move contacts 85 into closed position thereby completing a circuit through the power lead 63, power lead 84, contacts 85 to lead 86 and thence through motor 82 to ground. The motor 82 may be started either by manually closing a switch 82b or by the closing of contact 74 of thermal timer 62. Further movement of the motor 82 causes cam 87 to complete a circuit from power lead 84 through contact 88 on a lever 88a spring pressed against the cam to both a normally closed magnetic valve 89 and the solenoid 91 of a reagent pump 91a, through leads 92 and 93, respectively. Energizing the circuit to valve 89 causes it to open and remain open while the circuit is energized as determined by the length of the lobe on cam 87 to displace the water of the previous test in the cell 58 and fill it with a fresh sample of the water going to the outlet 7 of the valve being self-closing to terminate flow through the cell 58. Energizing the circuit to solenoid 91 energizes the solenoid and upon deenergization, by opening of the circuit, a measured quantity of reagent, such as soap, is injected by a diaphragm pump 91a as described in said Riche patent into the observation cell 58 through pipe 94. In this instance approximately 90 seconds is allowed for the reaction of the reagent with the sample before the lobe of cam 95 closes switch contacts 96 to energize lamp 98 and pass light through the sample in the observation cell. This reaction is such that if the water is hard, varying degrees of obscuration will be apparent in the sample proportional to the degree of hardness, while if the water is soft, the sample will remain clear. During this interval the thermo timer 62 has cooled sufficiently to open contact 74. Thus, further movement of motor 82 causes the lobe of cam 95 as above described to engage the support lever 96a which is biased to open position, closing contact 96 to complete a circuit from power lead 84, contact 96, lead 97 to light bulb 98 disposed on one side of the cell in a position to project light therethrough. At the closing of contact 96, another circuit is simultaneously energized to initiate a timing motor preferably a synchronous motor 101 that operates chopper bar 114 of a galvanometer presently to be described, as shown in Fig. 4. This circuit is from contact 96 of the hardness tester to lead 99 to the timing motor 101 and thence to ground. In addition to the initiation of the motor 101 the completion of this circuit energizes lamp 101a to indicate the condition of the circuit. A further circuit is also set up through conductor 99, to contact 102 of relay C, to an electromagnet 103 of relay C to ground, in order to cause the end of arm Y of the relay to be drawn downward past the end of arm X, resetting relay C to its normal position as shown in Fig. 4, from abnormal position with the arm Y uppermost, thereby reenergizing thermal timer 62 to time the period between tests.

If the water is soft, light rays from bulb 98 will be relatively unobstructed in their passage through the observation cell 58 and will fall with relatively great intensity upon a photoelectric cell 104 positioned on the opposite side of the cell 58. A suitable form of photoelectric cell is that made by G. M. Laboratories and sold under the name "Type F—3"," which is a selenium cell of the self-generating type. Energy from this photoelectric cell 104 is carried through the leads 105 and 106, as shown in Fig. 3, to a resistance 107, to a coil 108 of a movable coil, chopper bar, galvanometer 110 of conventional design such as that sold by G. M. Laboratories of Chicago, Illinois, under the designation No. 11886 galvanometer, and of the general type shown in U. S. Letters Patent 2,114,853 to Archie J. McMaster through external critical damping resistance 107a, shown in Fig. 4. The coil 108 carries a needle 109 movable therewith in accordance with the usual practice. The resistance 107 is adjusted so that when the water is soft and no obscuration occurs in the test cell, the output of the photoelectric cell 104 will energize the coil 108 of the galvanometer rotating the coil to cause needle 109 to shift to the soft position above a contact bar 115 while, if the water tests hard, the output of cell 104 is insufficient to rotate the coil 108 through a full swing and the needle 109 will remain at or near its point of rest above the "hard" contact bar 116.

Through a cam 111 on the shaft of motor 101 and sustaining contacts 112 and 113, a circuit through power lead 84 to timing motor 101 will be completed shortly after the motor starts so that this motor will always complete one 360° cycle of operation. A cam 111a carried on the motor shaft and acting on a lever 114a of chopper bar 114 causes chopper bar 114 to oscillate about pivots 114b within a narrow arc to permit needle 109 to be clamped in a closed position between the chopper bar 114 and either the "soft" contact bar 115 or the "hard" contact bar 116, when the flat spot on cam 111a engages the lever 114a depending on the result of the test. At this stage of the operations, so long as the needle shifts as above described to a point above the contact bar 115, no action occurs when the chopper bar moves to a closed position.

If the test sample of water within the cell 58 reaches a predetermined degree of hardness, such as one-half grain per gallon, the reduced amount of light from the bulb 98 falling upon the photoelectric cell 104 will cause needle 109 of the galvanometer to remain in the "hard" position above the contact bar 116. Thus, when clock motor 101 reaches the clamping phase in its revolution, the chopper bar 114 will clamp the needle against the bar 116 closing a circuit from power lead 84, through chopper bar 114, needle 109, contact bar 116 all of which are of electrically conductive material, lead 119, relay contact 121, and electromagnet 122 of relay A, drawing the arm X down causing the latter to shift to the abnormal position. The shifting of relay A opens contacts 121a, 271a, 64a, and 125a and closes relay contacts 271b, 64b, 125b, 173a, and 161a to complete and break a number of circuits in the process of initiating regeneration. These circuits will be taken up in due time.

Staging device for control of pilot

The circuit to "hard" lamp 123, which indicates hardness in the water, is completed through power lead 124, contacts 125 and 125b of relay A and lead 126. Also completed is a circuit, presently to be described, to a stager that actuates the movable plate 11 of the pilot 10. As shown in Fig. 5, this stager has a continuously running motor 127 whose circuit is power lead 63 and lead 128. The motor 127 rotates at a relatively high speed and actuates reduction gearing in gear box 129, causing a bevel gear 131 to rotate at a slower rate. In axial alignment with the axis of gear 131 is the drive shaft 132 which is fixed to the center of movable plate 11 of the pilot 10. Selectively engageable means for engaging bevel gear 131 with a complementary bevel gear 133 on the shaft 132 includes a gear 134 which is adapted to engage and disengage from the gears 131 and 133 as it is moved inwardly and outwardly therefrom in response to the energization and deenergization, respectively, of a selectively engageable means operating magnet 135, the gear 134 dropping out of mesh under its own weight and the weight of the magnet armature. This system of engagement for driving the shaft 132 has been found to index accurately the pilot 19, without objections such as overrun or variable movement, so that the hydraulic valves controlling the flow through the softener are efficiently and accurately operated in the proper sequence.

Shaft 132 of the stager has three cams 136, 151 and 155 mounted thereon, each of which has a pair of knobs disposed at 180° intervals so that rotation of the shaft through 180° completes the cam cycle for one regeneration, the shaft rotating through one-half turn at each regeneration. The shaft 132 also has a cam 147 affixed thereon having six depressions 149 therein separated by cam lobes, the depressions being arranged at 60° intervals around the cam. The cams 136, 151 and 155 are so arranged on the shaft that lobes of the cams will close the switches 137, 152 and 156 successively upon 60° rotations of the shaft and will allow these switches to open prior to completion of 60° rotation of the cams. The cam 147 is fixed to the shaft in a position such as to close switch 146 after the shaft starts rotation and hold this switch closed and keeps magnet 135 energized until the shaft has rotated a full 60° and to deenergize the magnet when the 60° rotation has been completed. It will be observed that upon the completion of each 60° rotation of the shaft, one of the switches 137, 152, and 156 is closed to precondition a circuit to the magnet 135. This switch mechanism it will be observed, is a simple program switch such as is well known in the art.

In Fig. 5 the cams are shown in a position of rest between regeneration cycles. In this position cam 136 "sets up" the stager to move the valves to the backwash position, one lobe of the cam engaging a switch lever 137a normally biased to open position, to close contact 137 to precondition a circuit to the magnet 135 whereby upon the shift of relay A to the abnormal position in response to energization of magnet 122 as heretofore described, circuit will be completed to the magnet 135, this circuit running from power lead 124, contacts 125 and 125b of relay A, lead 126, contacts 137, lead 138, magnet 135, and thence to ground by way of a switch 141 or a lamp 143 as will presently more fully appear. This movement of relay A also opens the circuit of "soft" lamp 331 at contact 125 and completes circuit to hard lamp 123 by way of power lead 124, contact 125 and conductor 126.

Where complete automatic operation is desired, knife switch 141 is closed so that upon the shift of relay A, as above-mentioned, the stager will be automatically initiated. Where semi-automatic operation is desired switch 141 is left open and when relay A is shifted to the abnormal position, current flows to ground from magnet 135 by way of lamp 143, illuminating this lamp as well as "hard" lamp 123, the lamp 143 preventing the flow of sufficient current to operate the magnet 135. Thereupon the circuit to clutch magnet 135 is manually completed through push button 142 to ground to start regeneration. Under these conditions, indicator bulb 143 of low amperage will be energized along with "hard" lamp 123 when relay A is shifted, thus informing the operator that the softener is set up for the initial or backwash stage of regeneration and all that need be done is the completing of a circuit manually, through push button 142 to shunt out the lamp 143 and cause sufficient current to flow to ground to energize the magnet. A relay 144 is simultaneously energized with the circuit through push button 142 or switch 141 to close contacts 144a thereby establishing a new ground for the circuit by way of conductor 139 to sustain a circuit through a ground 145 upon release of the push button 142 until the stager has indexed the pilot 19 through one stage of movement. Either fully automatic operation or semi-automatic operation of the softener, then, is obtained by either closing or opening, respectively, knife switch 141.

Upon initial movement of the cam 136, either as a direct result of the shifting of relay A or as a result of the closing of switch 142, the circuit to magnet 135 is sustained by closing of contact 146 by cam 147, the circuit being broken upon the completion of 60° movement by opening of contacts 146 carried on lever 146a biased to closed position and controlled by the lobes on a master cam 147, the completed circuit being through power lead 63, lead 148, contacts 146, to lead 138, magnet 135 and lead 139. Prior to opening of contacts 146 contacts 152 are closed by cam 151. Depressions 149 of cam 147 are spaced so that the circuit to magnet 135 is broken upon the completion of any 60° movement of drive shaft 132. The next cam 151 of the stager cams "sets up" the stager for movement of the hydraulic valve to positions which control the brine and rinse stages of the softening, that is, upon completion of the first 60° of rotation of drive shaft 132, contacts 152 carried on a spring pressed lever 152a are closed by the cam 151. Thus, when the backwash stage is completed, as determined by a test made by a turbidity tester which will be hereinafter described, a circuit will be completed to magnet 135 through the shift of a relay B to an abnormal position opposed to that of Fig. 4, this circuit being through power lead 63, contacts 153 and 153a of relay B, lead 154, stager contacts 152, lead 138, magnet 135 and lead 139. This causes a second 60° movement of the drive shaft 132 so that the hydraulic valves are moved by the pilot 19 to the brine and rinse position, whereupon brine is introduced into the tank 5 through the pipe 42 by action of the injector 43 and opening of motor valve 39, the rinse step being entered upon, without further movement of the hydraulic valves, after the introduction of a predetermined quantity of brine. Upon initial rotation of the cams, cam 147 again closes switch 146 and holds the circuit until the shaft has rotated another 60° and closed contacts 156.

At the completion of this second 60° movement or a total of 120° of movement of drive shaft 132, one lobe of final cam 155 of the stager "sets up" a circuit to magnet 135 through closing of contacts 156 by urging spring pressed lever 156a in a direction to close the contacts 156. The duration of the rinse is determined by tests made by the hardness tester which has returned to operation an interval, in this instance 25 minutes, after the appearance of high brine at an electrode 157 positioned in the lower end of vertical pipe 18 of the softening tank 5. This electrode may suitably be a conventional engine spark plug screwed into the pipe with the central electrode thereof connected to a contactor 233 of relay E as will presently be described. When the rinse is free from excess or spent brine and the effluent of the softener is soft, the photoelectric cell 104 of the hardness tester will cause needle 109 of the galvanometer to shift to a point immediately above "soft" contact bar 115 to complete a circuit from power lead 84, chopper bar 114, contact bar 115, lead 158, lead 159, contacts 161 and 161a, lead 162, to electromagnet 163 to ground whereupon arm Y is drawn down and arm X raises under the action of gravity on the stem V₁ and relay A is reset in its normal position as shown in Fig. 4. This shift of relay A completes the circuit previously set by the contact 156 of the stager, the circuit being power lead 63, lead 124, contacts 125 and 125a of relay A, lead 164, stager contact 156, lead 138, magnet 135, lead 139. This causes the stager to move a further 60° to complete a cycle of operation of 180° bringing the cams and switches back to the position shown in Fig. 5, whereupon the hydraulic valves controlled by pilot 10 are returned to the service position and the regeneration cycle is completed.

*Turbidity tester and the backwash phase*

The turbidity tester, like the hardness tester, is located in the instrument panel 57. Its function is to determine the duration of the backwash phase of softening, in order that the softener may be advanced to the brine step at the proper time. In the backwash phase, raw water is entering the inlet 6, proceeding downwardly through the vertical pipe 18 into the bottom of the tank 5, up through the mineral bed within the tank 5, and thence out through the drain 8. A small portion of the drain water is carried through a pipe 165 to a generally elongated observation cell 166 and thence returned to drain through a pipe 61. The flow is so regulated that water will flow continuously through the cell 166 at a predetermined rate so long as there is water flowing through the drain line 8. In order that an air space will not form in the top of the cell 166, one end of a pipe 167 is positioned in the top portion of the cell to carry off any air to the drain pipe 61. Windows 168 are located on opposite ends of the cell 166, a bulb 169 being positioned before one of the windows and a photoelectric cell 171 of the same type as the photoelectric cell 104 before the other so that the light absorption characteristic of the fluid within the cell 166 may be measured by the photoelectric cell 171.

When relay A shifts to the abnormal position in response to presence of hardness in the water being tested by the hardness tester, the controls of the turbidity tester are initiated. One of the circuits completed by the shifting of relay A is to the heater in a thermal timer 172 similar in structure to timer 62, as shown in Fig. 4, through power lead 63, lead 124, contacts 173 and 173a of relay A, lead 174, lead 175, contacts 176 and 176b of relay B, lead 177, to the heater of timer 172, to ground. At the same time, a circuit to the bulb 169 is energized. This circuit taps into the circuit of the heater of timer 172 at the contacts 176 and 176b of relay B, and thereafter consists of lead 180 which goes to the bulb 169 and thence to ground through lead 181. A counter 180a of conventional type may be provided in this circuit to be indexed upon each energization of light bulb 169 to record the number of regeneration cycles effected by the softening device. The test for turbidity is delayed until the backwash has continued to the point when hard water in the tank 5 has passed to drain and turbid backwash water is flowing through the cell 166. Upon the expiration of this predetermined time interval, in this instance approximately 10 minutes, blade 178 of the timer 172 completes a circuit from ground contact 179, blade 178, lead 182, motor 183, lead 184, contacts 185 and 185a of relay B, to power line 63. The energization of this circuit causes a timing motor 183 to actuate a chopper bar 186 of a chopper bar galvanometer 187 similar to galvanometer 110 and also to energize a "turbid" lamp 188 having a circuit through ground contact 179, the blade 178, lead 189, lamp 188, lead 191, contacts 192 and 192a of relay B and power lead 63. A resistance 193, an external critical damping resistance 193a, and coil 194 of the galvanometer 187 are so adjusted with respect to the energy in the leads 195 and 196 of the photoelectric cell 171 that a needle 197 operated by the coil will be positioned above the electrically isolated bar 198 so long as the water flowing through cell 166 is turbid and will shift to the opposite side, above a contact bar 199 upon the water becoming clear. Indication of movement of motor 183 and hence of the turbidity test is given by lamp 183a. The sustaining circuit for the motor 183 is through contacts 201 and 202 closed by a cam 183b on the shaft of motor 183 enabling it to make a complete revolution before stopping. The sustaining circuit then will be through power lead 63, sustaining contact 201, sustaining contact 202, motor 183, lead 182, blade 178, to ground contact 179.

When the backwash has progressed to the extent that the water flowing through the cell 166 is clear beyond a preselected turbidity sufficient light from lamp 169 will fall on light sensitive cell 171 to cause its output to be sufficient to energize galvanometer coil 194 and the needle 197 of galvanometer 187 to shift to a point over bar 199 as described in connection with galvanometer 110 to complete a circuit from power lead 63, chopper bar 186, needle 197, contact bar 199, lead 203, contacts 204 and 204a of relay B, contact 205, to electromagnet 206, to ground. This causes relay B to shift to an abnormal position with arm Y above arm X causing the circuit to the heater of timer 172 and to bulb 169 to be broken at contacts 176 and 176a, opening contacts 192a, 176b, 185a, and 204a of relay B and closing contacts 192b, 176a, 174a and 153a. A circuit to the stager is thus energized to index the pilot 10 to the next phase of regeneration, namely, the brine introduction phase. The circuit thus completed to the stager is through power lead 63, contacts 153 and 153a of relay B, lead 154, contact 152 of the stager, lead 138, magnet 135, and lead 139 to ground. Another circuit energized at the shift of relay B is that to a "clear" lamp 200 through power lead 63, contacts 192 and 192b of relay B, lead 210, "clear" lamp 200, lead 220, contacts 230 of relay E to ground.

*The brine and rinse phases of regeneration*

When the stager has moved the pilot 10 from the backwash position to the position for introducing brine, water flows through the inlet line upwardly past valve 33 through a pipe 44 through the injector 43 through the top portion of vertical pipe 18 down through the tank 5 and out through the lower portion of vertical pipe 18 to the drain line 8. Through the shift of relay B in response to the water testing clear in the turbidity tester as just described, a circuit is completed whereby the motor valve 39 in the brine line 42 is opened. This circuit begins near relay A of Fig. 4 from the power line 63 to the lead 124 to contacts 173 and 173a of relay A, lead 174, lead 175 to contacts 176 and 176a of relay B, and lead 208 to a step-up transformer 209 in Fig. 5. Relay 211, shown in Fig. 5, is thereupon energized, its circuit being from transformer 209 through lead 212 to lead 213 to electrode 214 located in the brine tank 41, the brine 215 within this tank serving to ground electrode 214 and thereby complete the circuit. Upon energization of this circuit, relay 211 shifts to complete a circuit to valve 39 through lead 216, relay contact 217, and lead 218 through the motorized valve to ground, whereby valve 39 is opened permitting brine to be sucked from the tank 41 by the injector 43 into the softening tank 5. The circuit to relay 211 is sustained during this interval through contact 219 of relay 211, lead 221, and electrode 222 which is grounded to the tank 41 in the presence of the brine 215. When the brine level reaches a point below the electrode 222, the ground circuit through both electrodes 214 and 222 will be broken, causing relay 211 to shift so that a circuit will be completed to close motor valve 39 through lead 216, contact 217, lead 223, to ground. The softener is automatically then in the rinse position, inasmuch as fresh water is continuing to flow through the inlet 6, through the injector 43, where it ceases to take on brine, down through the tank 5, out the bottom of the tank, and thence to drain line 8.

In the meantime, when brine first enters the top of tank 5, a circuit is completed to a "brine in" signal through electrode 224 in the top of vertical pipe 18, this circuit running from ground, through electrode 224, through lead 225, through the "brine in" lamp 226, lead 227, lead 228, lead 229, lead 231, contacts 64 and 64b of relay A, lead 124 and power lead 63.

At the presence of brine leaving tank 5 at an electrode 157 near the lower end of pipe 18, this being the spent brine displaced through the introduction of brine, a circuit is completed through the ground of tank 5, electrode 157, lead 232, contact 233 of relay E, lead 234, electromagnet 235, lead 236, lead 238, lead 228, lead 229, lead 231, contacts 64 of relay A, lead 124, and power lead 63. This causes relay E to shift to the abnormal position opening contacts 236 and 233 and closing contacts 239 and 278, causing "brine drain" lamp 237 to light by completion of circuit running from contacts 64 and 64b of relay A, lead 231, lead 229, lead 228, lead 238, contact 239 of relay E, lead 241, lead 242 of "brine drain" lamp 237, lead 243, lead 244, contact 245 of relay 246, and lead 247 to ground. Contemporaneously with the energization of this signal lamp circuit, a circuit to a heater in a thermal timer 248 similar to timer 62 is energized, this circuit being made through the contact 239 of relay E, lead 249, timer 248, lead 251, which junctions with lead 244 of the "brine drain" lamp 237, and thence to ground through relay 246. At the lapse of a suitable time, for example, approximately 25 minutes, blade 252 of the thermal timer 248 completes a circuit through a series relay 253 and thence on to the hardness tester motor 82 to re-initiate its operation. The circuit thus completed is through power lead 63, lead 124, contacts 64 and 64b of relay A, lead 231, lead 229, lead 228, lead 254, contact 255, blade 252, lead 256, lead 257, lead 258, series relay 253 and thence into lead 81 through lead 86 to the hardness tester motor 82. The hardness tester begins operation according to the manner previously described to test for the presence of brine in the rinse water. Indication of the hardness tester's return to operation is given by energization of a "brine test" lamp 259 whose circuit is completed simultaneously with the closing of blade 252 of the thermal timer 248, the circuit being from lead 258, through contact 261 of relay 253, through lead 262 to "brine test" lamp 259, to ground. At the same time, a circuit to relay 246, as shown in Fig. 4, is completed through lead 258, relay contact 261 of relay 253, lead 263, relay 246, lead 264, to ground. The shifting of relay 246 breaks the circuit to thermal timer 248 at relay contact 245, and sustains a circuit to relay 253 through a lead 265, a contact 266 of relay 246, and lead 258 causing the tester to operate continuously and conduct continuous tests.

The hardness tester conducts continuous tests during the rinse phase after the timer 248 closes, the test samples being taken at intervals of approximately 120 seconds. Continuous testing is effected through the maintenance of the circuit to motor 82 of the hardness tester by the energization of relay 246 at the actuation of series relay 253, whereby the circuit to series relay 253 and consequently motor 82 is sustained, this circuit being from power lead 63, lead 124, contacts 64 and 64b of relay A, leads 231, 229, 265, contact 266 of relay 246, lead 258, series relay 253, leads 81 and 86 to motor 82. It is clear, then, that the circuit to motor 82 will be maintained until relay A returns to the normal position to break the circuit at contacts 64 and 64b. When the effluent is free of brine and there is less than approximately one-half grain per gallon of hardness, the needle 109 of the galvanometer shifts to a position above the contact bar 115 to reset relay A in the normal position, this circuit being through power lead 84, chopper bar 114, needle 109, contact bar 115, lead 158, lead 159, contacts 161 and 161a of relay A, lead 162, electromagnet 163, to ground. Simultaneously with the return to the normal position of relay A, the relay B and relay E are caused to return to the normal position. Relay B is actuated by a circuit completed by the shift of relay A through power lead 63, lead 124, contacts 271 and 271a of relay A, lead 272, lead 273, contacts 274 and 274a of relay B, lead 275, to electromagnet 276 to ground which acts to return the relay to its original position of Fig. 4. Relay E is reset through a circuit tapping into the above-mentioned lead 272, to lead 277, to contact 278 of relay E, lead 279, electromagnet 281 to ground. As has already been brought out, the resetting of relay A initiates the pilot 10 through its last 60° period of rotation whereby the hydraulic valves are returned to the service position.

*Brine refill operation and pump controls*

As has been pointed out, the brine tank 41 is refilled through the operation of the pump 46 which draws brine from the brine storage tank 47 to the brine tank 41 through the pipe 50. In order that only a predetermined quantity of brine will be introduced into the softening tank 5, the pump 46 is held inoperative while the softener is in the process of regeneration.

When the softener is not regenerating, then, the circuit to motor 282 which controls the pump 46 is controlled by the brine level in brine tank 41 with respect to electrodes 283 and 284 within this tank. When the level in the tank 41 is even with electrode 283, a circuit is completed from a transformer 285, lead 286, relay 287, lead 288, electrode 283, to ground of tank 41 through the brine 215. When the brine level falls below electrode 283, the circuit to relay 287 is sustained through electrode 284, lead 289 and contact 291 of relay 287. However, the circuit to relay 287 is broken when the brine level goes below electrode 284, thereby causing relay 287 to shift and to energize the circuit to motor 282 of the brine pump, this circuit being from line 56, lead 292, contact 293 of relay 287, lead 294, motor 282, lead 295, and line 53. The relay 287 will again be energized upon the brine level reaching the electrode 283, whereby the relay circuit is again completed and the circuit to motor 282 is broken at the contact 293 of relay 287.

As has already been described, the relay A shifts to the abnormal position when the hardness tester indicates hardness in the water, thereby either throwing the softener into regeneration if set for automatic operation, or setting the softener up for initiation of regeneration by the actuation of the push button 142 shown in Fig. 5, if set for semi-automatic operation. At this shifting of relay A, a circuit is completed to a relay 296, this circuit running from power lead 63, lead 124, contacts 173 and 173a of relay A, lead 174, lead 297, relay 296 to ground. The energization of relay 296 completes two circuits, one of which is from transformer 285 through lead 298, relay contact 299 of relay 296, lead 301, lead 288, relay 287, and lead 286. This sustains the energization of relay 287 to prevent the actuation of motor 282 of the brine pump 46 irrespective of the brine level in the brine tank 41, thus preventing refilling of the brine tank 41 during the regeneration period. Relay 296 also provides a shunt circuit around pressure switch 51 of the pump 48, so that pump 48 is continuously operated to provide water in the inlet line 6 during the regeneration period, irrespective of the water level in the tank 49 which otherwise controls pressure switch 51. The circuit thus completed is from line 53, lead 54, lead 302, contact 303 of relay 296, lead 304, motor 52 lead, 55 and line 56.

*Device for notifying of a fault*

If a fault develops in any of the control steps of regeneration, a clean-up device takes over the control of the regeneration whereby the softener is eventually returned to the service position, the operator is signaled as to the existence of the fault, and further automatic operation of the regeneration cycle is prevented until an operator remedies the trouble.

As shown in Fig. 4, this device includes a motor 305, having a half revolution per hour rate of rotation, cams 308, 311, and 316, switch levers 307a, 317a and 312a riding the cams, and contacts 307, 317 and 312 opened and closed by operation of the cams against the levers operated thereby, and a relay D. Upon the shift of relay A to the abnormal position at the start of regeneration, the motor 305 is energized through power lead 63, lead 124, contact 64 and 64b of relay A, lead 231, lead 306, contact 307, and motor 305 to ground. Upon initiation, the circuit to motor 305 is sustained by the lobe of cam 308, permitting contact lever 307a to engage lower contact 307 to complete a sustaining circuit through lead 309, whereby the motor is always returned to its original starting position. The lever 307a is a metallic lever having resiliency and is positioned to bear against the cam 308 as a result of which it follows the curvature of cam 308. The cam 308 is shaped so that when the lobe thereof, which is the protruding part of the peripheral surface thereof, is disposed away from the lever 307a, the end of this lever will engage lower contact 307 permitting current to flow between the lever and the contact. The lever 307a and contacts 307 shown in the drawings constitute simply a diagrammatic showing of any conventional and well known double-throw switch adapted for cam operation. After the expiration of approximately 30 minutes, or other suitable period, and after the softener has been placed in the backwash phase, the lobe of cam 311 closes contact 312 to complete a circuit from power lead 63, lead 124, contacts 271 and 271b of relay A, lead 313, lead 314, contact 312, lead 315, lead 203, contacts 204 and 204a of relay B, lead 205, electromagnet 206 to ground, whereupon relay B is shifted to the abnormal position. It will be recalled that relay B is normally shifted to the abnormal position through the action of the turbidity tester which actuates relay B through a circuit completed by galvanometer 187 when the backwash through the turbidity tester tests clear. Thus, if the backwash period exceeds a preselected period without actuating relay B, relay B is automatically shifted through movement of cam 311 by motor 305, after which the previously described steps of regeneration are continued, the softener being eventually returned to the service position in a regenerated condition.

In the event that fault occurs at some point in the regeneration period so that the softener has not returned to service after the expiration of approximately one hour or other suitable period as determined by the speed of motor 305, cam 316 of motor 305 completes a circuit through contact 317, this circuit being through power lead 63, lead 124, contacts 271 and 271b of relay A, lead 313, contact 317, lead 318, contact 319 of relay D, electromagnet 321, to ground. This causes relay D to shift to the abnormal position opposed to that of Fig. 4 whereby relay A is returned to the normal position through a circuit consisting of power lead 63, lead 322, contacts 323 and 323a of relay D, lead 324, contacts 161 and 161a of relay A, lead 162, electromagnet 163, to ground. A circuit is also completed to a "fault" lamp 325, through lead 322, contacts 326 and 326a of relay D, lead 329, "fault" lamp 325, to ground. Resetting of relay A to the normal position acts to return the softener to the service position through the circuits thus energized. It will be remembered that if relays B and E are set in the abnormal position, they are returned to the normal position upon the resetting of relay A to the normal position. A circuit that is broken by the shift of relay D in response to timed movement of motor 305, is a circuit to the heater 71 of thermal timer 62 which controls the frequency of the hardness tests while the softener is in the service position. This circuit is broken by contact 66 of relay D. Thus, when relay D is actuated, the operator is advised of the fault through the energization of "fault" lamp 325, the hardness tester is prevented from making further tests, and the softener controls are locked out to prevent further automatic control. In order to restore the softener to automatic control, the operator must actuate a push button 328 to complete a circuit through electromagnet 329 of relay D, whereby the relay D is reset to the normal position.

Operation

When pump 48 is inactive, no water is flowing through the softener and the power lead 63, that terminates in transformer 60, is dead. The power lead 63 is connected with a source of power only when transformer 60 is energized either through a circuit completed by the closing of pressure switch 51 from line 53, lead 54, switch 51, lead 330, transformer 60, to line 56, or through a sustaining circuit to motor 52 through a shunt around pressure switch 51 consisting of the lead 302, contact 303 and lead 304. This shunt circuit is completed by the closing of relay 296 in response to the energization of lead 297 upon the shift of relay A at the start of regeneration, the relay 296 being provided to prevent the pump 51 from being shut off while a test or regeneration operation is in progress so as to prevent interruption of the tester or the regeneration cycle after it has once been started. It will be obvious that since regeneration is started in response to a test of the water flowing in the system, regeneration will not be initiated or tests made except when the pump 48 is in operation. It is clear, then, that the power lead 63, which supplies the energy for all controls but the brine refill control, is dead unless pump motor 52 is operating.

During the service position, when the softener is in operation, pump 48 is operating through completion of the circuit to motor 52 by the closing of pressure switch 51 in response to the lowering of the water level in storage tank 49. At this time water is flowing through inlet line 6, up through vertical pipe 18 to the top of tank 5, down through tank 5, up through the lower portion of vertical pipe 18, and out through the service line 7 into storage tank 49. The hardness tester completes a series of test cycles at periodic intervals as the circuit of thermal timer 62 is broken and made by the movement of blade 72. Each closing of blade 72 operates to shift relay C to initiate movement of motor 82 of the hardness tester to begin the test cycle and to break the circuit to heater 71 of the thermal timer 62. Toward the conclusion of the test cycle, cam 95 of the motor 82, completes a circuit to reset relay C and to energize a circuit to bulb 98 in order that photoelectric cell 104 may measure the light absorption characteristic of the segregated sample within the observation cell 53. So long as the effluent tests soft, galvanometer needle 109 swings to the "soft" side so that relay A remains in the normal position. At that time, an indicator "soft" bulb 331 is lighted through a circuit consisting of power lead 63, lead 124, contact 125 of relay A, and lead 164, advising the operator of the result of the tests.

If the water tests hard, galvanometer needle 109 remains on the "hard" side to cause relay A to shift to the abnormal position. This lights "hard" lamp 128 and "sets up" the stager for its first 60° movement of the pilot 10. If the knife switch 141 of the stager is open as in the semi-automatic setting, the operator merely presses the push button 142 to complete a circuit from ground through push button 142, lead 139, clutch magnet 135, lead 138, contact 137, lead 126, contact 125, lead 124, and power lead 63. This causes the stager to move the pilot 10 through an angle of 60° to the backwash position, this movement being controlled, after initiation, by the master cam of the stager which makes and breaks a sustaining circuit through contact 146.

In the backwash stage, valves 29 and 32 are open and the remaining valves are closed, causing the flow to be through inlet 6, down through vertical pipe 18, up through the softening tank 5, down through a pipe 332, past the valve 32, to the drain line 8. A portion of the drain effluent is then passing through drain line 165 through observation cell 166 of the turbidity tester.

At the start of regeneration, one of the circuits completed by the shift of relay A is the circuit to the heater of thermal timer 172 along with a circuit to bulb 169 of the turbidity tester through lead 180, contact 176, lead 175, lead 174, contact 173 of relay A, lead 124, and power lead 63. When the apparatus is located where there may be wide temperature variations, the thermal timers 172 and 248 may be replaced by clock timers of conventional form. After the expiration of a suitable time corresponding to that required for clear water to be passed from the head space of the softener tank and turbid water to be discharged, blade 178 of timer 172 completes a circuit energizing motor 183 that actuates the chopper bar 186 of galvanometer 187 and also energizes the "turbid" lamp 188. When the effluent passing through cell 166 of the turbidity tester reaches a predetermined degree of clearness, needle 197 of galvanometer 187 completes a circuit through power lead 63, chopper bar 186, needle 197, contact bar 199, lead 203, contact 204 of relay B, lead 205, electromagnet 206 to ground, causing the shift of relay B to the abnormal position and causing the completion of a circuit to "clear" lamp 200. If the softener is in its automatic setting, a circuit completed by the shift of relay B is the circuit to the stager through lead 154, whereby, through the closing of contact 152, the stager is caused to rotate the pilot 10 a further angle of 60° to place the softener in the brine phase. If the softener is in its semi-automatic setting, push button 142 must be actuated to initiate this movement of the pilot 10.

During the brine phase, the hydraulic valves 33 and 36 are open, the remaining hydraulic valves being closed, causing flow through inlet line 6, past valve 33, through pipe 44, past the injector 43, in and down through the tank 5, out through the lower portion of vertical pipe 18, past valve 31 in pipe 332, and out through the drain line 8. Contemporaneously with the shifting of relay B, a circuit through lead 208 is energized to move the motor valve 39 to open position. This permits the injector 43 to draw brine from the brine tank 41 until the brine level in the brine tank 41 reaches a point below the electrode 222, whereupon the motor valve 39 is closed. At the presence of brine around an electrode 224 at the top of vertical pipe 18, a circuit is completed by conductivity causing the energization of "brine in" lamp 226. When the brine has passed down through the tank and spent brine has reached the electrode 157 in the bottom of vertical pipe 18, a circuit through lead 232 is completed, causing the shift of relay E. At the same time, the heater of thermal timer 248 along with the "brine drain" lamp 237 is energized.

Upon the closing of motor valve 39, it will be apparent that the softener enters the rinse stage without movement of the pilot 10, the fresh water continuing to flow past the injector through the same flow route as the brine flow route. After the expiration of approximately 25 minutes, the thermal timer 248 completes a circuit through its contact 252, through series relay 253 and lead 81, whereby the hardness tester motor is initiated to begin an uninterrupted series of test cycles. At the same time, a circuit to "brine test" lamp 259 is energized. When the rinse water passing through observation cell 117 of the hardness tester is free of spent and/or excess brine and is soft, a circuit is completed by the galvanometer needle 109, whereby relay A is caused to return to the normal position. When the softener is in the automatic setting, this return completes a circuit previously "set up" by cam 155 of the stager, causing the stager to move the pilot a further 60°, whereupon the hydraulic valves are returned to the service position, as shown in Fig. 5. If the softener is in the semi-automatic setting, the actuation of push button 142 accomplishes this same movement. As previously pointed out, the return of relay A to the normal position completes circuits, causing relay B and relay E to return to the normal position. In addition, the heater 71 of the thermal timer 62, which controls the test intervals of the hardness tester, is again energized. Thus, the hardness tester returns to its periodic testing function and all the circuits are again set up for another regeneration cycle.

I claim:

1. The combination in a water softener of a softener tank, a source of regenerating solution, conduits connected with said tank for introducing raw water to be treated therein, introducing regenerating solution, carrying away treated water and a drain conduit, valve means for controlling the flow through said tank movable successively between service, backwash, regenerating, and rinse positions, testing means including a cell connected with the tank for testing the effluent of the tank for hardness during the service position and for regenerating solution during the rinse position, turbidity testing means including a cell connected to receive liquid from the tank for testing effluent going to the drain for turbidity while said valve means occupies the backwash position, valve actuating means for moving said valve means through said positions in succession, control means for said valve actuating means including a plurality of circuits and switches for operatively connecting the actuating means with said testing means to move the valve means from backwash to regenerating position when the turbidity testing means indicates less than a predetermined turbidity in the drain effluent and from the rinse position to service position when said first testing means indicates the absence of regenerating solution in the drain effluent of said tank.

2. The combination in a water treatment device of a treatment tank, a mineral therein for treating the water, raw water conduits connected with said tank for introducing water to be treated into either of the opposite ends thereof, a service conduit connected to one end of said tank for carrying treated water therefrom, a conduit connected to the opposite end of said tank from said service conduit for carrying waste water to drain, valve means controlling the flow through said tank movable to a position to terminate the flow through the service conduit and one of said raw water conduits to pass water in a reverse direction through the treatment tank to backwash the treatment tank, light sensitive means connected to said tank to receive backwash water therefrom, means connecting the valve means and the light sensitive means for energizing said light sensitive means upon movement of said valve means to the aforesaid position to effect a continuing test of the turbidity of the drain water, and means operated by said testing means when a predetermined turbidity is reached in the effluent of the treatment device for moving said valve means to another position.

3. The combination in a water treatment device of a treatment tank, a substance therein for treating the water, conduits connected with the said tank for introducing water to be treated therein, carrying treated water therefrom and for drain, valve means controlling the flow through said tank, movable to a position whereby the flow through the service line may be cut off, the drain line opened and water backwashed through the said tank to drain, light sensitive testing means to test turbidity of the drain water, said means including an observation cell having opposed windows through which the sample of water continuously passes in the presence of effluent in the drain, a source of light and a light sensitive cell, said source of light and said cell being placed on opposite sides of the said observation cell, means operated upon movement of said valve means to said position for starting said testing means, and means responsive to the said testing means for moving said valve means to another position to terminate the said backwash in the absence of a predetermined turbidity in the effluent of the said treatment device and for terminating the operation of said testing means.

4. The combination in a water treatment device of a treatment tank, a substance therein for treating the water, conduits connected with the said tank for introducing water to be treated therein, carrying treated water therefrom and for drain, valve means controlling the flow through said tank movable to a position for terminating flow of treated water and starting flow to drain, light sensitive testing means to test turbidity of the drain water, an observation cell having windows in its opposite ends, means for passing drain water from the conduit to drain through said observation cell, a source of light and a light sensitive cell, said source of light and said cell being placed to measure the light absorption characteristic of the fluid flowing through the said observation cell, timing means started upon movement of said valve means to said position to delay action of said testing means for a preselected time required for turbidity to appear in the drain, means operated by said timing means for energizing said source of light upon the lapse of the predetermined time, and electrical means responsive to the said testing means for signaling the operator when the turbidity in the effluent of the said treatment device reaches a predetermined minimum.

5. The combination in a water treatment device of a treatment tank, a substance therein for treating the water, conduits connected with the said tank for introducing water to be treated therein, carrying treated water therefrom and a drain conduit, valve means controlling the flow through said tank, light sensitive testing means to test turbidity of the drain water, said means including an observation cell having windows in its opposite ends, means for passing drain water from the drain conduit to waste through said observation cell, a source of light, a light sensitive cell, said source of light and light sensitive cell being located to measure the light absorption characteristic of the fluid flowing through the observation cell, a galvanometer responsive to the said light sensitive cell, a circuit, and switch means electrically connected with the said galvanometer for energizing said circuit, means actuated by the last-mentioned circuit when the light absorption characteristic drops below a preselected point as indicated by the output of said light sensitive cell for actuating said valve means to effect a change of flow through the said treatment tank in the absence of a predetermined turbidity in the effluent of the said treatment device.

6. The combination in a water treatment device of a treatment tank, a substance therein for treating the water, conduits connected with the said tank for introducing water to be treated therein, carrying treated water therefrom and a drain conduit, valve means controlling the flow through said tank, light sensitive testing means to test turbidity of the drain water, said means including an observation cell having windows in its opposite ends, means for passing drain water from the drain conduit to waste through said observation cell, a source of light, a light sensitive cell, said source of light and light sensitive cell being located at opposite ends of the said observation cell, a galvanometer responsive to the said light sensitive cell, and switch means including a circuit coupled with the said galvanometer, said galvanometer energizing the circuit at a preselected output of said light sensitive cell corresponding to a predetermined turbidity in the effluent of the said treatment device, and means actuated by the said switch means for controlling the said valve means to effect a change in the flow through the said tank.

7. A device as described in claim 6, which includes a timing device energized upon movement of said valve means to a preselected position, and means controlled by said timing device for starting said testing means to delay the making of the test of the said light sensitive testing means until turbid water has reached the said observation cell.

8. The combination in a water treatment device of a treatment tank having a regenerating material therein and a source of regenerating solution, valve means for controlling the flow through said tank movable between service, backwash, and rinse positions, means connected to one end of said tank for testing the effluent of the treatment device for exhaustion of the regenerating material during the service position and for regenerating solution during the rinse position, turbidity testing means connected to the opposite end of said tank for testing the effluent of the softener for turbidity during the backwash position, driving means for operating said valve means between said positions in the order enumerated, means connecting the first mentioned testing means and said driving means when the valve means are in the service position to move said valve means out of said position when said effluent indicates a predetermined hardness, means for connecting the turbidity testing means and the driving means in the backwash position of the valve means to move the valve means out of the backwash position upon the occurrence of a test by the turbidity testing means indicating a preselected minimum turbidity, and means for connecting the driving means and the first mentioned testing means in the rinse position of the valve means to move the valve means out of the rinse position upon the occurrence of a test indicating a preselected minimum brine content.

9. The combination in a water treatment device of a tank, valve means for controlling the flow through said tank movable between service, backwash, and rinse positions, light sensitive means for testing the effluent of the treatment device for turbidity during the backwash step, said means comprising a source of light, light sensitive means, an observation cell having oppositely disposed transparent windows and placed between the said source of light and light sensitive means, conduits connecting the said observation cell with the effluent of the softener, and a drain line from the said observation cell for the carrying off of all water passing through the said observation cell, means operated by movement of said valve means to the backwash position for energizing said testing means to effect a test, and electrical indicating means responsive to the light sensitive means for indicating the presence and absence of a predetermined turbidity in the water passing through the observation cell.

10. The combination in a water treatment device of a tank, valve means for controlling the flow through said tank movable between service, backwash, and rinse positions, light sensitive means for testing the effluent of the treatment device for turbidity during the backwash step, said means comprising a source of light, light sensitive means, an observation cell having oppositely disposed transparent windows and placed between the said source of light and light sensitive means, conduits connecting the said observation cell with the effluent of the softener, and a drain line from the said observation cell for the continuous carrying off of water passing through the said observation cell, means for operating said valve means and means energized by said light sensitive means responsive to the presence of a preselected minimum turbidity in the water flowing through the said observation cell for actuating the said operating means to operate said valve means from the backwash position to the regenerating position.

11. The combination in a water treatment device of a tank, hydraulically operated valve means for controlling the flow through said tank, and a stager for actuating the said valve means through a series of regenerating steps, said stager comprising a pilot, a drive shaft on said pilot, a continuously running motor, and selectively engageable means between said drive shaft and continuously running motor, means for engaging and disengaging said selectively engageable means, means connected to said shaft and to said engaging and disengaging means for disengaging said selectively engageable means at predetermined angular positions of said shaft, means for re-engaging said selectively engageable means at said predetermined angular positions to drive said drive shaft through a series of successive predetermined periods of rotation for intermittently indexing the said pilot from one position to the succeeding position in its cycle and fluid conduits connecting said pilot with said hydraulically operated valve means for operating said valve means upon movement of said pilot between its positions.

12. The combination in a water treatment device, of a tank, hydraulically operated valve means for controlling the flow through said tank, and a stager for actuating the said valve means through a series of regenerating steps, said stager comprising a rotatable pilot, a drive shaft on the said pilot, a continuously running motor, and selectively engageable means between the said drive shaft and continuously running motor movable between engaged and disengaged positions, electrically operated means for moving said selectively engageable means to one of said positions, circuit means including said electrical means and at least one switch, and cam means on the said drive shaft for operating said switch to control said electrical means to disengage the selectively engageable means upon the rotation of the said drive shaft through a predetermined period of rotation, switch means in said circuit for controlling said electrical means to move said selectively engageable means to said engaged position to index said pilot through a series of predetermined periods of rotation, and fluid conduits connecting said pilot and said hydraulically operated valve means for operating said valve means upon movement of said pilot between its positions.

13. The combination in a water treatment device of a treatment tank having a water treating material, a source of regenerating solution, conduits connected with the tank for providing a flow of water and regenerating solution through the tank and for carrying away treated water and a drain conduit, valve means including hydraulically operated valves for controlling the flow through said tank, a pilot for controlling said hydraulically operated valves, pilot actuating means for moving the pilot to index the same progressively through successive positions to move the valves through a regeneration cycle, said pilot actuating means including a drive shaft connected with the pilot, a continuously running motor, selectively engageable means for connecting the motor with and disconnecting it from the drive shaft, an electric circuit, electrically operated means in said circuit for actuating the selectively engageable means when the circuit is energized, cam means actuated by the drive shaft, contacts in said circuit operated by said cam means for sustaining and breaking the circuit for controlling periodic operation of the shaft, a first testing means including a cell connected with the tank for testing the effluent of the tank for hardness during service position and for regenerating solution during the rinse position, turbidity testing means including a cell connected with the drain conduit to receive liquid from the tank for testing effluent going to the drain for turbidity while said valves occupy the backwash position, and switch means responsive to the first testing means and the turbidity testing means for energizing said circuit and operating the selectively engageable means for successively actuating the pilot.

14. The combination in a water treatment device of a treatment tank having a water treating material, a source of regenerating solution, conduits connected with the tank for providing a flow of water and regenerating solution through the tank and for carrying away treated water and a drain conduit, valve means including hydraulically operated valves for controlling the flow through said tank, a pilot for controlling said hydraulically operated valves, pilot actuating means for moving the pilot to index the same progressively through successive positions to move the valves through a regeneration cycle, said pilot actuating means including a drive shaft connected to said pilot, a continuously running motor, selectively engageable means for connecting the drive shaft with the motor and for disconnecting it therefrom, electric circuit means, electrically operated means in said circuit means for actuating the selectively engageable means for connecting the drive shaft with the motor when the circuit means is energized, a plurality of pairs of contacts in said circuit means, cam means on said shaft arranged for successively operating pairs of contacts for closing said circuit means at the operated contacts during rotation of said shaft, master cam means on said shaft cooperating with one pair of contacts and constructed to close and open said one pair of contacts periodically during rotation of the shaft for sustaining and breaking the circuit for periodic rotation of the shaft, a first testing means including a cell connected with the tank for testing the effluent of the tank for hardness during service position and for regenerating solution during rinse position, turbidity testing means including a cell connected with the tank to receive liquid from the tank for testing effluent going to the drain for turbidity while said hydraulic valves occupy the backwash position, and switch means responsive to the hardness testing means and the turbidity testing means for energizing said circuit means and operating the selectively engageable means for successively actuating the pilot.

15. In a water treatment device, the combination of a treatment tank, a source of regenerating solution, conduits connected with said tank for introducing raw water to be treated therein introducing regenerating solution and carrying away treated water and a drain conduit, valve means for controlling the flow through the tank movable successively between service, backwash, regeneration, and rinse positions, circuit means, electrically operated means in said circuit for actuating the valve means, a first testing means including a cell connected with the tank for testing the effluent of the tank for hardness during the service position and for regeneration solution during the rinse position, turbidity testing means including a cell connected to the tank to receive liquid from the tank for testing effluent going to the drain for turbidity while the valve means occupies backwash position, means responsive to said first testing means for energizing the valve actuating means to move the valve means from the service to the backwash position, when the test indicates hardness in the treated water, means responsive to the turbidity testing means for energizing the valve actuating means to move the valve means from backwash to regeneration position when the turbidity testing means indicates less than a predetermined turbidity in the drain effluent and means responsive to said first testing means to energize the valve actuating means to move the valve means from rinse position to service position when the first testing means indicates the absence of regenerating solution in the drain effluent of said tank, and an automatic clean-up device for energizing said circuit and actuating the valve actuating means independently of said testing means including a motor having a predetermined rate of rotation, switch means in said circuit means for energizing said motor when said electrically operated means is energized upon movement of the valve means out of service position, contacts in said circuit means, and cams operated by the motor for closing said contacts at predetermined time intervals to energize said circuit means and actuate the valve actuating mechanism to move the valve means successively from backwash position to regeneration position and thereafter to service position, said clean-up device having means for opening the circuit to the first testing means whereby further operation thereof is locked out.

16. In a water treatment device, the combination of a treatment tank, a source of regenerating solution therefor, valve means for controlling the flow through said tank movable between service and a cycle of regenerating positions, driving means for moving said valve means between said positions, primary control means including a plurality of testers for testing the flow from said tank, relays operated by said testers and circuits connecting the tester relays and the driving means for operating said driving means to move said valve means in succession through a series of steps in measured sequence to regenerate said treatment device, and an automatic clean-up device to return the said treatment device to the service position if fault develops during the regeneration of the said treatment device comprising a timer, means for energizing the timer upon movement of the valve means from the service to the regenerating positions, and means operated by the timer including circuits for operating said driving means to move the valve means between said positions in timed relation.

17. In a water treatment device, the combination of a treatment tank, a source of regenerating solution connected with the tank, conduits connected with the tank for introducing raw water to be treated therein introducing regenerating solution and for carrying away treated water and a drain conduit, valve means for controlling the flow through the tank movable successively between service, backwash, regenerating and rinse positions, a circuit, electrically operated means in said circuit for actuating said valve means, testing means including a cell connected with the tank for testing the effluent of the tank for hardness during service position, for turbidity during the backwash position and for regeneration solution during rinse position, means including circuits and relays responsive to the testing means for energizing the valve actuating means to move the valve means from service position to backwash position, for energizing the valve actuating means to move the valve means from backwash position to regenerating position and for energizing the valve actuating means to move the valve means back to service position in response to tests on the effluent, an automatic clean-up device to return the treatment device to service position in the event that fault develops during the regeneration cycle of the said treatment device including a timer, means operated by the timer adapted to energize the valve actuating means at predetermined intervals of time to move the valve means from backwash position to regenerating position if the valve means has not been operated by the testing means and to move the valve means to service position if the valve means has not been operated thereto by the testing means, and means operated by said timer to open the circuit to the testing means after the valve means has been returned to service position for terminating the control of the valve means by the testing means, whereby the treatment device is locked out of automatic operation.

18. In a water treatment device, the combination of a treatment tank, a source of regenerating solution, conduits connected with said tank for introducing raw water to be treated therein introducing regenerating solution and carrying away treated water and a drain conduit, valve means for controlling the flow through the tank movable successively between service, backwash, regenerating and rinse positions, a circuit, electrically operated means in said circuit for actuating the valve means, a first testing means including a cell connected with the tank for testing the effluent of the tank for hardness during the service position and for regenerating solution during the rinse position, turbidity testing means including a cell connected to the tank to receive liquid from the tank for testing effluent going to the drain for turbidity while the valve means occupies backwash position, means responsive to the turbidity testing means for energizing the valve actuating means to move the valve means from backwash to regeneration position when the turbidity testing means indicates less than a predetermined turbidity in the drain effluent and from rinse position to service position when the first testing means indicates the absence of regenerating solution in the drain effluent of said tank, an automatic clean-up device adapted to energize said circuit and actuate the valve actuating means including a motor having a predetermined rate of rotation, means for energizing said motor upon movement of the valve means out of service position, pairs of contacts connected with said circuit, cams operated by the motor for successively closing said contacts after a predetermined time interval to energize said circuit and actuate the valve actuating mechanism to move the valve means from backwash position to brine position and after a further predetermined interval of time to actuate the valve actuating mechanism to move the valve means to service position, and a relay in circuit with the hardness testing means and operated by the motor to open the circuit to the hardness testing means for locking the treatment device against automatic operation when the treatment device is returned to service position by said clean-up device.

19. In a water treatment device, the combination of a tank, a source of regenerating solution, an inlet for raw water, an outlet for service water and a drain, valve means for controlling the flow through the said tank, electrical testing means to test for the absence of regenerating solution in the effluent of said tank, an electrode immersed in the drain effluent of the said tank, a circuit including said electrode arranged to be closed by the presence of high percentage brine in said drain effluent, timing means in said circuit started by closing of the same, a switch on said timing means closed thereby at the expiration of a predetermined period, and a circuit connected with the said switch and said testing means for initiating operation of the said electrical testing means upon the closing of the said switch.

20. The combination in a water treatment device of a treatment tank, a substance therein for treating the water, a source of regenerating solution, conduits connected with said tank for introducing water to be treated therein introducing regenerating solution and carrying treated water therefrom and a drain conduit, valve means controlling the flow through said tank, testing means for testing for the presence of regenerating solution in the effluent of the tank, means responsive to said testing means for actuating the valve means, timing means for initiating operation of the testing means upon the lapse of a predetermined time, and a conductivity electrode disposed in the drain effluent and electrically connected with said timing means for initiating operation of the same after the appearance of regenerating solution in the effluent of the tank.

21. The combination in a water treatment device of a treatment tank, a substance therein for treating water, a source of regenerating solution, conduits connected with said tank for introducing water to be treated therein introducing regenerating solution and carrying treated water therefrom and a drain conduit, valve means controlling the flow through said tank, a circuit, electrically operated means in said circuit for actuating the valve means when the circuit is energized, testing means for testing the effluent for hardness when the valve occupies the service position and for absence of regenerating solution in the effluent when the valve means occupies rinse position including a cell connected with the tank for receiving effluent from the tank, a second testing means connected to receive drain water from said tank for testing the drain water for turbidity in the backwash position, signal means for indicating the presence of hardness in the service water, the absence of turbidity in the drain water and the absence of regenerating solution in the drain water, electrical circuits connecting said testing means to said signal means, means controlled by the testing means to energize and deenergize said last mentioned circuits, and manually operated control means including a push button in said first mentioned circuit for controlling the same for moving said valve means from service position through successive positions and return to service position through successive actuation of said push button as indicated by the signal means.

22. The combination in a water treatment device of a treatment tank, a substance therein for treating the water, a source of regenerating solution, conduits connected with said tank for introducing water to be treated therein introducing regenerating solution and carrying treated water therefrom and a drain conduit, valve means controlling the flow through said tank, light sensitive testing means to test turbidity of the drain water, said means including a test cell having windows, means for passing drain water from the drain conduit to waste through said cell, a source of light, a light sensitive cell, said source of light and light sensitive cell being located to pass light from the source through the water in said test cell onto the light sensitive cell, means responsive to said light sensitive cell and including a circuit, electrically operated valve actuating means in said circuit for actuating said valve means at a predetermined turbidity of the drain water for moving the valve means to another position, a signal means, and a circuit connected with the turbidity testing means for energizing said signal means during the test of the turbidity.

23. The combination in a water softener of a treatment tank, a source of regenerating solution, conduits connected with said tank for introducing raw water to be treated therein introducing regenerating solution and carrying away treated water and a drain conduit, valve means for controlling the flow through said tank movable successively between service, backwash, regenerating, and rinse positions, testing means including a cell connected with the tank for testing the effluent of the tank for hardness during the service position and for regenerating solution during regenerating position, electrically operated valve actuating means for moving said valve through said positions in succession, means responsive to the testing means for energizing the valve actuating means to move the valve means from service position to backwash position when the testing means indicates hardness in the effluent to the service conduit, the last mentioned means including switch means in said circuit, and a signal means electrically connected with the switch means for indicating the presence of hardness in the effluent when the valve actuating means is energized.

24. The combination in a water softener of a treatment tank, a source of regenerating solution, conduits connected with the tank for introducing raw water to be treated therein introducing regenerating solution and carrying away treated water and a drain conduit, valve means for controlling the flow through said tank movable successively between service, backwash, regenerating, and rinse positions, a first testing means including a cell connected with the tank for testing the effluent of the tank for hardness during the service position and for regenerating solution during rinse position, electrically operated valve actuating means for actuating the valve means to move the valve means from service position to backwash position when the hardness testing means indicates hardness in the effluent of the tank, a signal electrically connected with the first testing means for indicating hardness in the effluent, turbidity testing means including a cell connected with the drain conduit to receive liquid from the tank for testing effluent going to the drain for turbidity while said valve means occupies backwash position, means responsive to the turbidity testing means to energize said valve actuating means to move the valve from backwash position to regenerating position when the turbidity testing means indicates less than a predetermined turbidity in the drain effluent, a signal electrically connected with the turbidity testing means and energized by the same for indicating a turbidity test, said first testing means operating to energize the valve actuating means to move the valve means back to service position when test indicates absence of regenerating solution in the effluent of the tank, and a signal electrically connected with said first testing means and energized by the latter when test indicates absence of regenerating solution in the effluent and the water is clear.

25. In a water treatment device, the combination of a treatment tank having a source of regenerating solution, an inlet for hard water and regenerating solution, service outlet for soft water and a drain, valve means for controlling the flow through the said tank movable between service, regenerating and rinse positions, means for driving said valve means between said positions, testing means for testing the water for hardness when the valve occupies the service position and for absence of brine in the effluent when the valve means occupies the rinse position, means operated by said testing means to control the operation of said driving means, an electrode immersed in said drain effluent, a circuit to the said electrode energized upon initiation of regeneration by the said control means, said circuit being completed by the presence of regenerating solution at said electrode, timing means in said circuit started by completion thereof, a switch on said timing means operable at the expiration of a predetermined period, and circuits connected with the said switch for initiating operation of the said electrical testing means at the closing of the said switch.

26. In a water treatment system, the combination of a liquid treatment device requiring periodic regeneration including a water treatment tank, a source of regeneration solution, conduits for raw water, service water, regeneration solution, and a drain conduit and valve means for controlling the flow therethrough movable through the service, backwash and rinse steps in a regeneration cycle, a source of liquid supply, a pump for drawing liquid from the source of supply, a water storage tank for water delivered by the said pump and passed through the treatment device, an electrically controlled motor for the said pump including a plurality of independent circuits therefor, a pressure switch in one of the circuits of the electrically controlled motor, said pressure switch being connected to said storage tank and responsive to a predetermined amount of stored liquid so that the said pump will be operated upon the liquid reaching the predetermined amount, a relay in another of the said circuits for controlling the flow of current to said motor, means for energizing said relay upon movement of said valve means to backwash and rinse positions and for de-energizing the same upon movement of said valve means to service position whereby operation of the said pump will be sustained once the said relay has been energized irrespective of the position of the said pressure switch.

27. The combination in a water treatment device of a treatment tank, a source of regeneration solution, conduits for raw water, service water, regeneration solution and a drain conduit, valve means in said conduits movable through steps to effect a cycle of regeneration, electrically operated control means connected to said valve means, electrically operated testing means connected to said service conduit operative in at least one of said steps to test the effluent of said tank, a circuit connecting said testing means and said control means for energizing said control means in response to a test, said circuit including a latch-in relay for maintaining said circuit closed in the event of a temporary electrical power failure to resume operation of said cycle at the point left off upon the resumption of power supply.

28. The combination in a water treatment device of a treatment tank, a substance therein for treating the water, conduits connected with said tank for introducing water to be treated therein and carrying treated water therefrom and a drain conduit, valve means controlling the flow through said conduits, light sensitive testing means to test turbidity of drain water when the valves occupy the backwash position, said means including an observation cell having windows in its opposite ends, means for passing drain water from the drain conduit to waste through said observation cell, a source of light, a light sensitive cell, said source of light and light sensitive cell being located at opposite ends of said observation cell, a relay energized by said light sensitive cell, a circuit coupled with said relay, and a second relay connected in said circuit and energized thereby at a predetermined turbidity of the drain water, and means energized by the operation of said second relay for operating said valve mechanism to move the valves out of backwash position.

29. The combination in a water softener of a softener tank, a source of regenerating solution, conduits connected with said tank for introducing raw water to be treated therein, introducing regenerating solution, carrying away treated water and a drain conduit, valve means for controlling the flow through said tank movable successively between service, backwash, regenerating, and rinse positions, a first testing means including a cell connected with the tank for testing the effluent of the tank for hardness during the service position and for regenerating solution during the rinse position, turbidity testing means including a cell connected to receive liquid from the tank for testing effluent going to the drain for turbidity while said valve means occupies the backwash position, valve actuating means for moving said valve means through said positions in succession, control means including means responsive to the first testing means for energizing the valve actuating means to move the valve means from service position to the backwash position when the first testing means indicates hardness in the effluent to the service conduit, and means responsive to the turbidity testing means to energize the valve actuating means to move the valve from the backwash position to the regenerating position when the turbidity testing means indicates less than a predetermined turbidity in the drain effluent, said control means being also responsive to the first testing means to energize the valve actuating means to move the valve means back to the service position when the first testing means indicates the absence of regenerating solution in the drain effluent of the tank.

30. In a water treatment device, the combination of a treatment tank, a source of regenerating solution connected with the tank, conduits connected with the tank for introducing raw water to be treated therein introducing regenerating solution and for carrying away treated water and a drain conduit, valve means for controlling the flow through the tank movable successively between service, backwash, regenerating and rinse positions, a circuit, electrically operated means in said circuit for actuating said valve means, testing means including a cell connected with the tank for testing the effluent of the tank for hardness during service position for turbidity during the backwash position and for regeneration solution during rinse position, means including circuits and relays responsive to the testing means for energizing the valve actuating means to move the valve means from service position, for energizing the valve actuating means to move the valve means from backwash position to regenerating position, and for energizing the valve actuating means to move the valve means back to service position in response to tests on the effluent, an automatic clean-up device to return the treatment device to service position in the event that fault develops during the regeneration cycle of the said treatment device including a timer, means operated by said timer adapted to energize the valve actuating means at predetermined intervals of time to move the valve means from backwash position to regenerating position if the valve means has not been operated by the testing means and to move the valve means to service position if the valve means has not been operated thereto by the testing means, means operated by said timer to open the circuit to the testing means after the valve means has been returned to service position for terminating the control of the valve means by the testing means, whereby the treatment device is locked out of automatic operation, signal means for indicating faulty operation of the testing means, and means operated by said timer for energizing the signal means when the valve actuating means is energized by said timer.

31. In a water treatment device, the combination of a tank, a source of regenerating solution, inlets for raw water and regenerating solution, an outlet for service water and a drain, valve means for controlling the flow through the said tank, testing means to test for the presence of regenerating solution in the effluent of said tank, an electrode immersed in the drain effluent of the said tank, a circuit including said electrode arranged to be closed by the presence of high percentage regenerating solution in said drain effluent, timing means in said circuit started by closing of the same, a switch on said timing means closed thereby at the expiration of a predetermined period, a circuit connected with the said switch and said testing means for initiating operation of the said testing means upon the closing of the said switch, a signal means for indicating when said testing means is in operation, and a circuit connecting the signal means with the timer and energized by said timer.

FRED W. WHITLOCK.